UNITED STATES PATENT OFFICE.

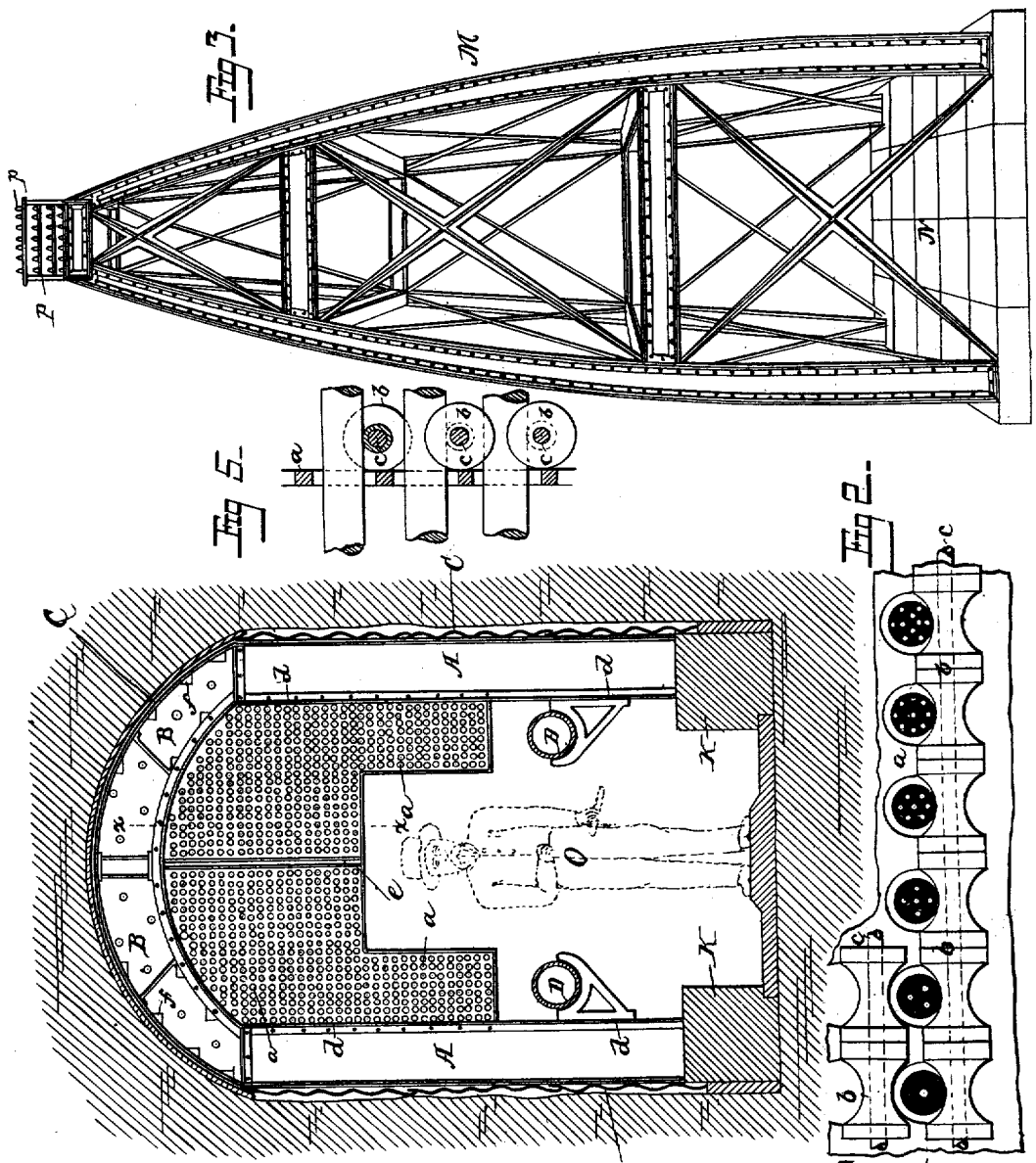

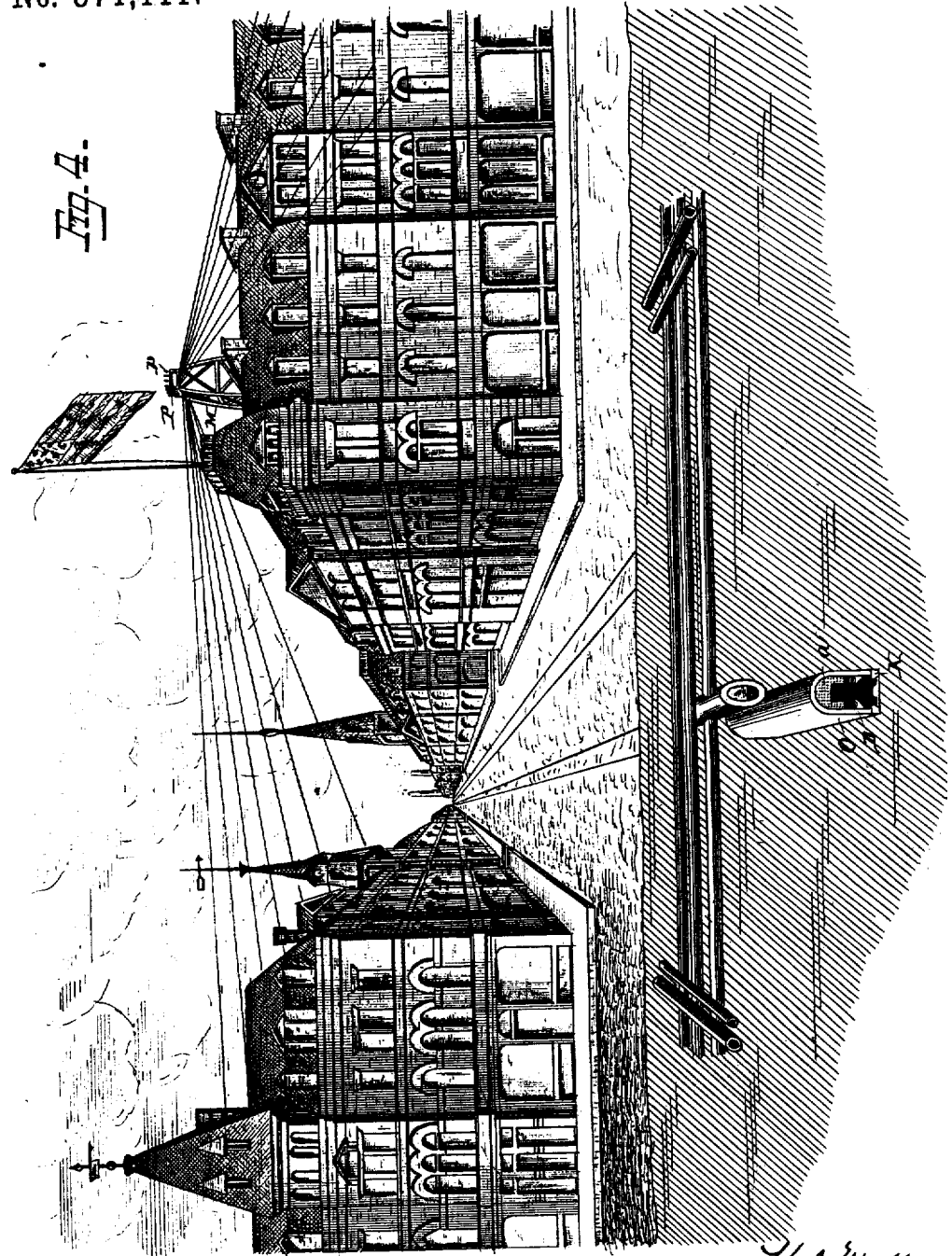

THOMAS WALLACE, OF NEW YORK, N. Y.

CONDUIT FOR ELECTRICAL DISTRIBUTION.

SPECIFICATION forming part of Letters Patent No. 371,111, dated October 4, 1887.

Application filed September 25, 1885. Renewed February 14, 1887. Serial No. 227,603. (No model.)

*To all whom it may concern:*

Be it known that I, THOMAS WALLACE, a citizen of the United States, residing in the city, county, and State of New York, have invented certain new and useful Improvements in Conduits for Electrical Distribution, of which the following is a specification.

My invention relates to systems of electrical distribution, and more especially to the manner of providing for the arrangement of the electric conductors; and it has for its object to provide a practical way of disposing of such conductors so as to avoid the necessity of stringing them upon poles or other supports erected in the streets.

My invention consists, primarily, in an underground conduit constructed as more particularly pointed out hereinafter, whereby the bulk of the conductors may be arranged therein, and in the combination therewith of an aerial system of supports for the conductors, whereby the individual lines may be extended to the various subscribers.

Referring to the accompanying drawings, forming part of this specification, Figure 1 is a cross-section of a conduit embodying my invention. Fig. 2 is a detail of the same. Fig. 3 illustrates the construction of a tower or support used in the aerial system. Fig. 4 is a general view showing the combination of the two systems of underground and aerial distribution; and Fig. 5, an enlarged detail section taken on a portion of the line *x x*, Fig. 1.

The necessity of practically doing away with the present system of aerial distribution of electric conductors, especially in large cities, is well recognized, and various means have been suggested.

By my invention the electric wires, serving as conductors of currents of various kinds and for different uses, are arranged in conduits within an underground tunnel in such a manner that they are properly supported and protected from disturbing influences of all sorts and are readily accessible for purposes of maintenance.

The conduit O is composed entirely of iron and stone, and is in any proper form, though I prefer that shown in the drawings, as it is strong and durable and well adapted for the purpose. The base K consists of stone or similar material, upon which is supported the frame-work of the conduit, which is composed of cast or rolled iron standards A, sustaining arch-pieces B, of similar material, and these are securely connected together by bolts or otherwise. This frame-work is covered with plates C, of iron, preferably corrugated and secured to the standards and arches, forming a skin or covering for the conduit.

Secured to suitable flanges upon the standards and arches are the iron plates *a*, which serve as braces to the structure of the conduit, and these plates are perforated with holes of suitable size for the passage of the conductors. The arch-pieces and the standards are also perforated for the passage of cables of telegraph and telephone wires, or electric light and power conductors.

Supported upon the flanges *d* of the standards and flanges *e* of the brace-plates, as well as in the ribs *f* of the arches, are rods or bars *c*, preferably of metal, upon which are mounted insulators *b*, of glass or porcelain, in the form of rollers. These rollers are located in proper relation to the perforations, as shown in Fig. 2, so that the wires or cables will rest entirely upon the insulators without contact with the metal plates, thus preventing injury to the conductors and allowing them to be freely drawn over the rollers in stringing or adjusting them.

The conduit shown is of such form and dimensions as to permit the line-man to walk through the same in an upright position, and the bottom may be formed with an elevation in the center and depressions at the sides, forming drains for the seepage of the tunnel, and on the sides thereof, supported in suitable brackets or otherwise, are large tubes D, which may be used for a variety of purposes, as pneumatic dispatch-tubes, &c.

Suitable testing-stations may be located at convenient points in the conduit for the usual purposes.

The whole structure of the conduit is covered with some suitable composition which will thoroughly insulate the same and protect it from rust or corrosion.

In the general disposition of the circuits—as of telephone-exchanges—the wires and cables for the several district or sub stations will pass through the conduit, and at proper intervals the subscribers' wires may be taken out of the conduit and led to some central position—as the middle of a square or rear of a lot—and carried to one of the various towers, such as is shown in Fig. 3, and from thence the individual wires will be carried direct to the premises of the various subscribers, thus necessitating no supports upon the buildings, except such as are desired to sustain the individual subscriber's wire. These towers may be variously constructed, according to the necessities of the case, that shown consisting of a substantial iron frame-work, M, rising from a stone base, N, and carrying suitable bars or rods, P, to which the pegs and insulators p are attached in distributing the individual circuits.

It is evident that the details of construction of the conduit may be varied without departing from the spirit of my invention, and that the conduit may be used without the towers.

Having thus described my invention, what I claim is—

1. A conduit for electrical purposes, consisting of a frame of iron standards and arch-pieces, each perforated for the passage of electric conductors, covering-plates of iron supported upon the standards and arch-pieces, and metal brace-plates secured to the standards and arch-pieces and perforated for the passage of conductors, and means connected with the brace-plates for supporting the conductors, substantially as described.

2. A conduit consisting of metal standards and arch-pieces secured to said standards, corrugated inclosing-plates supported upon the standards and arch-pieces, and brace-plates connected to the standards and arch-pieces, having perforations for the passage of conductors, and insulating-rolls secured to said plates in juxtaposition to said perforations to support the conductors, substantially as described.

3. In a conduit, the combination of the perforated brace-plates with bars arranged in juxtaposition with the perforations, and grooved insulating-rollers upon said bar for supporting the cables passing through the perforations in the plates, substantially as described.

In testimony whereof I have signed my name to this specification in the presence of two subscribing witnesses.

THOMAS WALLACE.

Witnesses:
W. W. WATSON,
H. FOWELL.